(12) United States Patent
Onishi et al.

(10) Patent No.: US 8,569,386 B2
(45) Date of Patent: Oct. 29, 2013

(54) HYDROCARBON SYNTHESIS REACTION APPARATUS, HYDROCARBON SYNTHESIS REACTION SYSTEM, AND HYDROCARBON SYNTHESIZING METHOD

(75) Inventors: Yasuhiro Onishi, Tokyo (JP); Yuzuru Kato, Tokyo (JP); Eiichi Yamada, Tokyo (JP)

(73) Assignees: Japan Oil, Gas and Metals National, Corporation, Kanagawa (JP); Inpex Corporation, Tokyo (JP); JX Nippon Oil & Energy Corporation, Tokyo (JP); Japan Petroleum Exploration Co., Ltd., Tokyo (JP); Cosmo Oil Co., Ltd., Tokyo (JP); Nippon Steel Engineering Co., Ltd., Tokyo (JP)

( * ) Notice: Subject to any disclaimer, the term of this patent is extended or adjusted under 35 U.S.C. 154(b) by 274 days.

(21) Appl. No.: 12/998,187

(22) PCT Filed: Sep. 25, 2009

(86) PCT No.: PCT/JP2009/004894
§ 371 (c)(1),
(2), (4) Date: Apr. 26, 2011

(87) PCT Pub. No.: WO2010/038399
PCT Pub. Date: Apr. 8, 2010

(65) Prior Publication Data
US 2011/0196048 A1    Aug. 11, 2011

(30) Foreign Application Priority Data

Sep. 30, 2008   (JP) .................................. 2008-253214

(51) Int. Cl.
*C07C 27/00* (2006.01)
*B01J 8/18* (2006.01)

(52) U.S. Cl.
USPC ........................... 518/700; 518/705; 422/140

(58) Field of Classification Search
USPC .................................... 422/140; 518/700, 705
See application file for complete search history.

(56) References Cited

U.S. PATENT DOCUMENTS

| 4,477,594 A | 10/1984 | Greene et al. |
| 5,284,878 A | 2/1994 | Studer et al. |

(Continued)

FOREIGN PATENT DOCUMENTS

| JP | 2007-509908 | 4/2007 |
| JP | 2007-533662 | 11/2007 |

(Continued)

OTHER PUBLICATIONS

Krishna et al., "Design and scale-up of the Fischer-Tropsch bubble column slurry reactor," Fuel Processing Technology, 64 (1-3), p. 73-105, 2000.

(Continued)

*Primary Examiner* — Jafar Parsa
(74) *Attorney, Agent, or Firm* — Kenyon & Kenyon LLP

(57) ABSTRACT

A hydrocarbon synthesis reaction apparatus which synthesizes a hydrocarbon compound by a chemical reaction of a synthesis gas including a hydrogen and a carbon monoxide as the main components, and a slurry having solid catalyst particles suspended in a liquid, the apparatus is provided with: a reactor in which the synthesis gas contacts with the slurry; and an unreacted gas supply device which draws unreacted gas from the reactor, then pressurizes the unreacted gas, and supplies the unreacted gas to a constituent device which constitutes the hydrocarbon synthesis reaction apparatus.

7 Claims, 3 Drawing Sheets

(56) References Cited

U.S. PATENT DOCUMENTS

2002/0035163 A1\* 3/2002 Vogel et al. .................. 518/728
2004/0176481 A1 9/2004 Guillard et al.

FOREIGN PATENT DOCUMENTS

| WO | 2004/101475 | 11/2004 |
| WO | WO 2005/044954 | 5/2005 |
| WO | WO 2005/103211 | 11/2005 |

OTHER PUBLICATIONS

International Search Report dated Oct. 27, 2009 issued in corresponding PCT Application No. PCT/JP2009/004894.

European Search Report, dated Feb. 10, 2012, issued in corresponding European application No. 09817442.8.

\* cited by examiner

HYDROCARBON SYNTHESIS REACTION APPARATUS, HYDROCARBON SYNTHESIS REACTION SYSTEM, AND HYDROCARBON SYNTHESIZING METHOD

TECHNICAL FIELD

The present invention relates to a hydrocarbon synthesis reaction apparatus which synthesizes a hydrocarbon compound by introducing a synthesis gas including a hydrogen gas and a carbon monoxide gas as the main components into a slurry having solid catalyst particles suspended in a liquid, a hydrocarbon synthesis reaction system including the same, and a hydrocarbon synthesizing method.

This application is a national stage application of International Application No. PCT/JP2009/004894, filed Sep. 25, 2009, which claims priority to Japanese Patent Application No. 2008-253214, filed Sep. 30, 2008, the content of which is incorporated herein by reference.

BACKGROUND ART

As one of the methods for synthesizing liquid fuels from natural gas, a GTL (Gas to Liquids: liquid fuel synthesis) technique of reforming natural gas to produce synthesis gas containing a carbon monoxide gas (CO) and a hydrogen gas ($H_2$) as the main components, synthesizing liquid hydrocarbons as a hydrocarbon compound by the Fischer-Tropsch synthesis reaction (hereinafter referred to as "FT synthesis reaction"), with this synthesis gas as a source gas, and further hydrogenating and refining the liquid hydrocarbons to produce liquid fuel products, such as naphtha (raw gasoline), kerosene, gas oil, and wax, has recently been developed.

As a hydrocarbon synthesis reaction system which produces liquid fuels using this GTL technique, as shown in the following Patent Document 1, a configuration including a hydrocarbon synthesis reaction apparatus which synthesizes a hydrocarbon compound by a chemical reaction, such as an FT synthesis reaction, of a synthesis gas and a slurry having solid catalyst particles suspended in a liquid is known.

Meanwhile, conventionally, the pressurized gas is supplied to constituent devices which constitute the hydrocarbon synthesis reaction apparatus if required in order to prevent the slurry or the like from flowing backwards from a connecting part with other constituent devices or in order to supply a fluid contained inside to the other constituent devices or the like. In addition, for example, inert gases, such as nitrogen gas, which is obtained by evaporating nitrogen kept in a cold energy facility or the like from the viewpoint of catalyst deterioration control, is suitably utilized as this pressurized gas.

CITATION LIST

Patent Document

[PATENT DOCUMENT 1] PCT Japanese Translation Patent Publication No. 2007-533662

SUMMARY OF THE INVENTION

Problem that the Invention is to Solve

However, in the above conventional hydrocarbon synthesis reaction apparatus, the nitrogen gas is supplied from the outside of the synthesizing system which synthesizes a hydrocarbon compound. Therefore, as the nitrogen gas is used more and more, construction cost of apparatus for the nitrogen gas increases, and a large quantity of energy is required in order to synthesize the hydrocarbon compound. As a result, there is a problem in that running cost increases.

That is, first, in order to use the nitrogen gas, a storage facility, such as a cold energy facility for keeping this nitrogen gas, is further required. When a large quantity of nitrogen gas is used, a large-capacity storage facility is required, and construction cost increases at the time in order to construct this storage facility. In addition, when the apparatus is run to synthesize a hydrocarbon compound, a large amount of energy for cooling/heating or the like is required and running cost increases.

Moreover, this nitrogen gas may be mixed with an inflammable gas produced in the process of the FT synthesis reaction, and be incinerated as a flare gas. In this processing, it is necessary to utilize incineration facilities, such as a flare stack. Therefore, when a large amount of gas is to be incinerated, a large-capacity incineration facility is required. This increases the cost of constructing an incineration facility. In addition, since a large amount of energy for incineration disposal is required, the running cost also increases as a result.

The present invention was made in view of the above-described situations, and the object thereof is to provide a hydrocarbon synthesis reaction apparatus, a hydrocarbon synthesizing method, and a hydrocarbon synthesis reaction system including the hydrocarbon synthesis reaction apparatus, which can reduce the amount of pressurized gas used to be supplied from the outside of a synthesizing system which synthesizes a hydrocarbon compound, reduce the construction cost of the apparatus, and synthesize a hydrocarbon compound at low cost, while saving energy.

Means for Solving the Problem

In order to solve the above problem, the present invention proposes the following means.

The hydrocarbon synthesis reaction apparatus according to the present invention is a hydrocarbon synthesis reaction apparatus which synthesizes a hydrocarbon compound by a chemical reaction of a synthesis gas including a hydrogen and a carbon monoxide as the main components, and a slurry having solid catalyst particles suspended in a liquid, the apparatus is provided with a reactor in which the synthesis gas contacts with the slurry; and an unreacted gas supply device which draws an unreacted gas from the reactor, then pressurizes the unreacted gas, and supplies the unreacted gas to a constituent device which constitutes the hydrocarbon synthesis reaction apparatus.

The hydrocarbon synthesizing method which synthesizes a hydrocarbon compound by a chemical reaction of a synthesis gas including hydrogen and carbon monoxide as the main components, and a slurry having solid catalyst particles suspended in a liquid, the method includes: drawing an unreacted gas from the reactor, pressurizing the unreacted gas, and supplying the unreacted gas to a constituent device which constitutes the hydrocarbon synthesis reaction apparatus.

Here, the unreacted gas is an unreacted synthesis gas which has been introduced into the reactor but has not chemically reacted with the slurry, a gas (for example, a gas including a hydrocarbon gas whose carbon number is equal to or less than 4 as the main components) which is produced in the course of a chemical reaction in the reactor, etc.

According to the hydrocarbon synthesis reaction apparatus and the hydrocarbon synthesizing method of the present invention, the unreacted gas drawn from the inside of the reactor by the unreacted gas supply device is pressurized, and then supplied to a constituent device which constitutes the hydrocarbon synthesis reaction apparatus. This unreacted gas can then be utilized as the pressurized gas. For this reason, it is possible to reduce the amount of a pressurized gas supplied from the outside of a synthesizing system which synthesizes a hydrocarbon compound, reduce the construction cost of the hydrocarbon synthesis reaction apparatus, and make it possible to synthesize a hydrocarbon compound at a low cost, while saving energy.

The constituent device may be an instrument inserted into other constituent device which the slurry is contained in or flowed through, and the unreacted gas supply device supplies the unreacted gas to the instrument, thereby sealing a connecting part between the instrument, and the other constituent device.

In this case, since a connecting part between the instrument and the other constituent device can be sealed by the unreacted gas, a precise measurement by the instrument is attained.

In addition, when the instrument is not sealed, there is a possibility that measurement by the instrument may not be precisely performed, for example, if the catalyst particles in the slurry stick to or block the connecting part.

The constituent device may be a containing drum which contains a fluid of at least one of the slurry and the hydrocarbon compound, and connects with other constituent device to supply the fluid to the other constituent device, and the unreacted gas supply device supplies the unreacted gas to the containing drum, thereby supplying the fluid to the other constituent device from the containing drum.

In this case, the unreacted gas can supply the fluid in the containing drum to the other constituent device.

The containing drum may contain the hydrocarbon compound, the other constituent device may be a mixed fluid separating device which separates a mixed fluid of the hydrocarbon compound and the catalyst particles into respective ones, and the unreacted gas supply device may supply the unreacted gas to the containing drum, thereby supplying the hydrocarbon compound contained in the containing drum as a washing liquid which washes the mixed fluid separating device.

In this case, since the unreacted gas can supply the hydrocarbon compound to the containing drum as a washing liquid which washes the mixed fluid separating device, the mixed fluid separating device can be maintained in a clean state. For this reason, since the hydrocarbon compound and the catalyst particles can be smoothly separated from each other, it is possible to efficiently separate the hydrocarbon compound or the catalyst particles from the mixed fluid.

In addition, when the mixed fluid separating device is not washed, there is a possibility that separation may not be smoothly performed, for example, since the catalyst particles in the slurry stick to the inside of the mixed fluid separating device.

The unreacted gas supply device may have a pressurizing part which pressurizes the unreacted gas, a first flowing part which draws the unreacted gas in the reactor to supply the unreacted gas to the pressurizing part, and a second flowing part which supplies the unreacted gas pressurized by the pressurizing part to the constituent device.

In this case, the unreacted gas in the reactor which has flowed through the first flowing part and has been supplied to the pressurizing part can be pressurized by the pressurizing part, the unreacted gas can be made to flow through the second flowing part, and be supplied to a constituent device. Particularly, in this case, since the first and second flowing parts are provided, the setting position of the pressurizing part can be made arbitrary, and the flexibility in the design can be improved.

The hydrocarbon synthesis reaction system according to the present invention includes the hydrocarbon synthesis reaction apparatus according to the present invention, a synthesis gas production unit which reforms a hydrocarbon feedstock to produce the synthesis gas, and supplies the synthesis gas to the reactor of the hydrocarbon synthesis reaction apparatus; and an upgrading unit which refines the hydrocarbon compounds into liquid fuels.

Since the hydrocarbon synthesis reaction system related to the present invention includes the hydrocarbon synthesis reaction apparatus which can synthesize a hydrocarbon compound at low cost while saving energy and reducing production cost, the construction cost of the apparatus of the hydrocarbon synthesis reaction system can be reduced, and liquid fuels can be synthesized at low cost, while saving energy.

Advantage of Invention

According to the hydrocarbon synthesis reaction apparatus and the hydrocarbon synthesizing method related to the present invention, it is possible to reduce the amount of pressurized gas used to be supplied from the outside of a synthesizing system which synthesizes a hydrocarbon compound and reduce the construction cost of the apparatus, and synthesize a hydrocarbon compound at low cost, while saving energy. Further, since the hydrocarbon synthesis reaction system related to the present invention includes the hydrocarbon synthesis reaction apparatus, the construction cost of the apparatus of the hydrocarbon synthesis reaction system can be reduced, and liquid fuels can be synthesized at a low cost, while saving energy.

DESCRIPTION OF EMBODIMENTS

Figure 1:
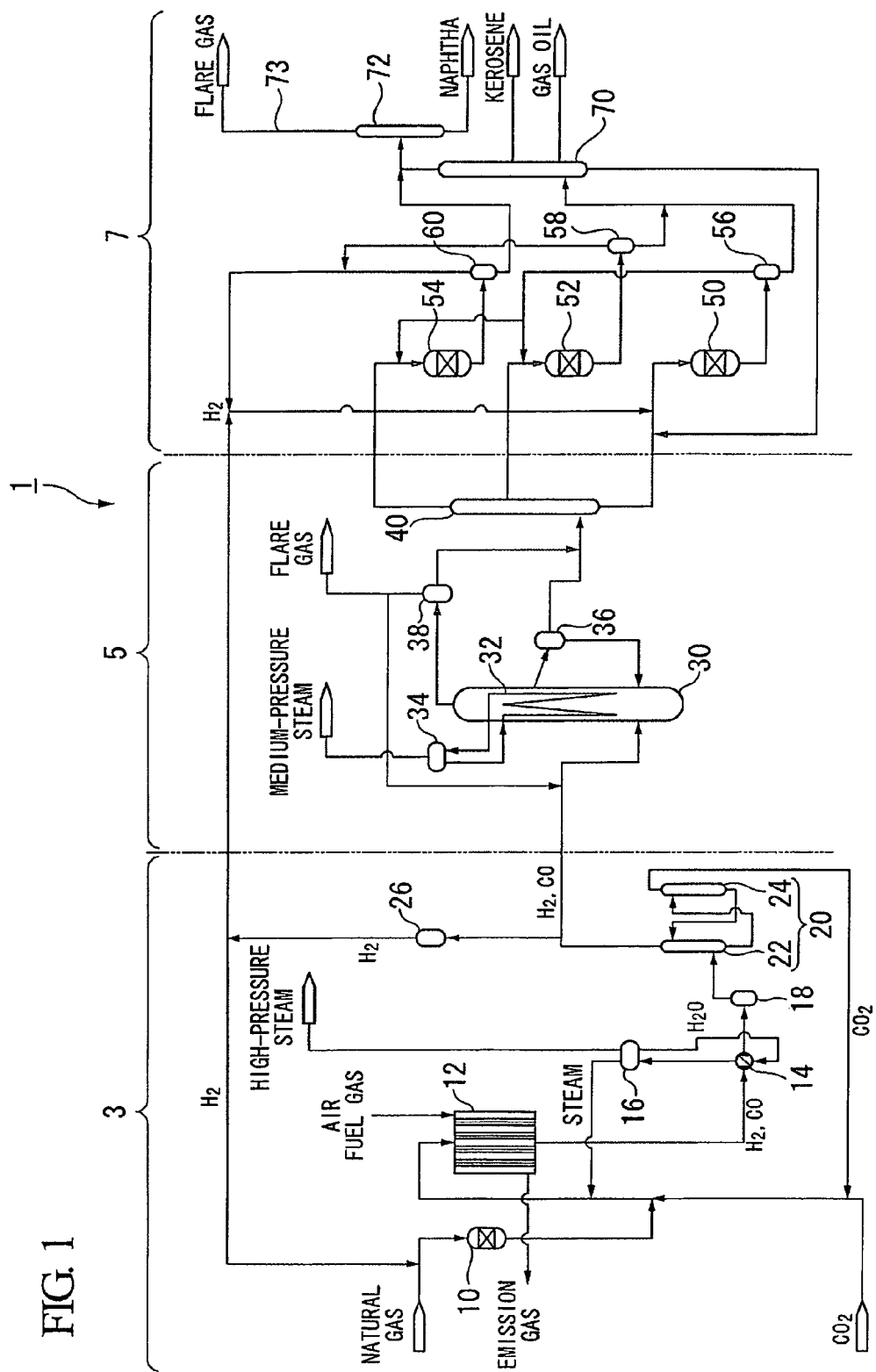
FIG. 1 is a view showing the overall configuration of a liquid fuel synthesizing system of one embodiment according to the present invention.

Hereinafter, the preferred embodiments of the invention will be described in detail with reference to the accompanying drawings. In addition, in the present specification and drawings, duplicate description is omitted by giving the same reference numerals to constituent elements having substantially the same functional configurations.

First, with reference to FIG. 1, the overall configuration of a liquid fuel synthesizing system (hydrocarbon synthesis reaction system) 1 which carries out the GTL (Gas to Liquids) process according to an embodiment of the invention will be described. FIG. 1 is a view showing the overall configuration of the liquid fuel synthesizing system 1 according to the present embodiment.

As shown in FIG. 1, the liquid fuel synthesizing system 1 according to the present embodiment is a plant facility which carries out the GTL process, which converts a hydrocarbon feedstock, such as a natural gas, into liquid fuels. This liquid fuel synthesizing system 1 includes a synthesis gas production unit 3, an FT synthesis unit (hydrocarbon synthesis reaction apparatus) 5, and an upgrading unit 7. The synthesis gas production unit 3 reforms a natural gas, which is a hydrocarbon feedstock, to produce a synthesis gas including a carbon monoxide gas and a hydrogen gas. The FT synthesis unit 5 produces liquid hydrocarbons (hydrocarbon compounds) from the produced synthesis gas by the Fischer-Tropsch synthesis reaction (chemical reaction) (hereinafter referred to as "FT synthesis reaction"). The upgrading unit 7 hydrogenates and hydrocracks the liquid hydrocarbons produced by the FT synthesis reaction to produce liquid fuel products (naphtha, kerosene, gas oil, wax, etc.). Hereinafter, constituent parts of each of these units will be described.

First, the synthesis gas production unit 3 will be described. The synthesis gas production unit 3 mainly includes, for example, a desulfurizing reactor 10, a reformer 12, a waste heat boiler 14, vapor-liquid separators 16 and 18, a $CO_2$ removal unit 20, and a hydrogen separator 26. The desulfurizing reactor 10 is composed of a hydrodesulfurizer, etc., and removes sulfur components from a natural gas as a feedstock. The reformer 12 reforms the natural gas supplied from the desulfurizing reactor 10, to produce a synthesis gas including a carbon monoxide gas (CO) and a hydrogen gas ($H_2$) as the main components. The waste heat boiler 14 recovers waste heat of the synthesis gas produced by the reformer 12, to produce a high-pressure steam. The vapor-liquid separator 16 separates the water heated by heat exchange with the synthesis gas in the waste heat boiler 14 into a vapor (high-pressure steam) and a liquid. The vapor-liquid separator 18 removes a condensate from the synthesis gas cooled down in the waste heat boiler 14, and supplies a gas to the $CO_2$ removal unit 20. The $CO_2$ removal unit 20 has an absorption tower 22 which removes a carbon dioxide gas by using an absorbent from the synthesis gas supplied from the vapor-liquid separator 18, and a regeneration tower 24 which desorbs the carbon dioxide gas and regenerates the absorbent including the carbon dioxide gas. The hydrogen separator 26 separates a portion of the hydrogen gas included in the synthesis gas, the carbon dioxide gas of which has been separated by the $CO_2$ removal unit 20. It is to be noted herein that the above $CO_2$ removal unit 20 is not necessarily provided depending on circumstances.

Among them, the reformer 12 reforms a natural gas by using a carbon dioxide and a steam to produce a high-temperature synthesis gas including a carbon monoxide gas and a hydrogen gas as the main components, by a steam and carbon-dioxide-gas reforming method expressed by the following chemical reaction formulas (1) and (2). In addition, the reforming method in this reformer 12 is not limited to the example of the above steam and carbon-dioxide-gas reforming method. For example, a steam reforming method, a partial oxidation reforming method (PDX) using oxygen, an autothermal reforming method (ATR) that is a combination of the partial oxidation method and the steam reforming method, a carbon-dioxide-gas reforming method, and the like can also be utilized.

$$CH_4+H_2O \rightarrow CO+3H_2 \quad (1)$$

$$CH_4+CO_2 \rightarrow 2CO+2H_2 \quad (2)$$

Further, the hydrogen separator 26 is provided on a line branched from a main pipe which connects the $CO_2$ removal unit 20 or vapor-liquid separator 18 to the bubble column reactor (reactor) 30. This hydrogen separator 26 can be composed of, for example, a hydrogen PSA (Pressure Swing Adsorption) device which performs adsorption and desorption of hydrogen by using a pressure difference. This hydrogen PSA device has adsorbents (zeolitic adsorbent, activated carbon, alumina, silica gel, etc.) within a plurality of adsorption columns (not shown) which are arranged in parallel. By sequentially repeating processes including pressurizing, adsorption, desorption (pressure reduction), and purging of hydrogen in each of the adsorption columns, a high-purity (for example, about 99.999%) hydrogen gas separated from the synthesis gas can be continuously supplied.

In addition, the hydrogen gas separating method in the hydrogen separator 26 is not limited to the example of the pressure swing adsorption method as in the above hydrogen PSA device. For example, there may be a hydrogen storing alloy adsorption method, a membrane separation method, or a combination thereof.

The hydrogen storing alloy method is, for example, a technique of separating hydrogen gas using a hydrogen storing alloy (TiFe, $LaNi_5$, $TiFe_{0.7-0.9}$, $Mn_{0.3-0.1}$, $TiMn_{1.5}$, etc.) having a property which adsorbs or emits a hydrogen by being cooled or heated. By providing a plurality of adsorption columns in which a hydrogen storing alloy is contained, and alternately repeating, in each of the adsorption columns, adsorption of hydrogen by cooling of the hydrogen storing alloy and emission of hydrogen by heating of the hydrogen storing alloy, hydrogen gas in the synthesis gas can be separated and recovered.

Further, the membrane separation method is a technique of separating hydrogen gas having excellent membrane permeability out of a mixed gas, using a membrane made of a polymeric material, such as aromatic polyimide. Since this membrane separation method is not accompanied with a phase change, less energy for running is required, and the running cost is low. Further, since the structure of a membrane separation device is simple and compact, the facility cost required is low, and the facility area required is small. Moreover, since there is no driving device in a separation membrane, and a stable running range is wide, there is an advantage in that maintenance and management is easy.

Next, the FT synthesis unit 5 will be described. The FT synthesis unit 5 mainly includes, for example the bubble column reactor 30, a vapor-liquid separator 34, a separator (mixed fluid separating device) 36, a vapor-liquid separator 38, and a first fractionator 40.

The bubble column reactor 30 carries out the FT synthesis reaction of the synthesis gas produced in the above synthesis gas production unit 3, i.e., a carbon monoxide gas and a hydrogen gas, to produce liquid hydrocarbons. The vapor-liquid separator 34 separates the water flowed and heated through a heat transfer pipe 32 disposed in the bubble column reactor 30 into a steam (medium-pressure steam) and a liquid. The separator 36 is connected to a middle part of the bubble column reactor 30 to separate a catalyst and a liquid hydrocarbon product. The vapor-liquid separator 38 is connected to an upper part of the bubble column reactor 30 to cool down the unreacted synthesis gas (CO and $H_2$) that is, the unreacted gas in the bubble column reactor 30, and a gaseous hydrocarbon product. The first fractionator 40 distills the liquid hydrocarbons supplied via the separator 36 and the vapor-liquid separator 38 from the bubble column reactor 30; it separates and refines the liquid hydrocarbons into individual fractions according to boiling points.

Among them, the bubble column reactor 30, which is an example of a reactor which synthesizes the synthesis gas into liquid hydrocarbons, functions as an FT synthesizing reactor which synthesizes liquid hydrocarbons from synthesis gas by the FT synthesis reaction. This bubble column reactor 30 is composed of, for example, a bubble column slurry bed type reactor in which a slurry consisting of a catalyst and a medium oil is reserved inside a column container. This bubble column reactor 30 produces liquid hydrocarbons from synthesis gas by the FT synthesis reaction. In detail, in this bubble column reactor 30, the synthesis gas as a source gas is supplied as bubbles from a sparger at the bottom of the bubble column reactor 30, and passes through the slurry consisting of a catalyst and a medium oil, and in a suspended state, a hydrogen gas and a carbon monoxide gas are brought into a synthesis reaction, as shown in the following chemical reaction formula (3).

$$2nH_2 + nCO \rightarrow (-CH_2-)_n + nH_2O \quad (3)$$

Since this FT synthesis reaction is an exothermic reaction, the bubble column reactor 30, which is a heat exchanger type reactor within which the heat transfer pipe 32 is disposed, is adapted such that, for example, water (BFW: Boiler Feed Water) is supplied as a coolant so that reaction heat of the above FT synthesis reaction can be recovered as a medium-pressure steam by heat exchange between the slurry and water. In addition, the unreacted synthesis gas that is, a gas which has not been reacted within the bubble column reactor 30, and a gaseous hydrocarbon product are heated by the heat generated in the FT synthesis reaction, allowed to rise, and are supplied to the vapor-liquid separator 38. Further, in the present embodiment, liquid hydrocarbons are used as a medium oil of the aforementioned slurry.

Finally, the upgrading unit 7 will be described. The upgrading unit 7 includes, for example, a wax fraction hydrocracking reactor 50, a kerosene and gas oil fraction hydrotreating reactor 52, a naphtha fraction hydrotreating reactor 54, vapor-liquid separators 56, 58 and 60, a second fractionator 70, and a naphtha stabilizer 72. The wax fraction hydrocracking reactor 50 is connected to the bottom of the first fractionator 40. The kerosene and gas oil fraction hydrotreating reactor 52 is connected to the middle part of the first fractionator 40. The naphtha fraction hydrotreating reactor 54 is connected to an upper part of the first fractionator 40. The vapor-liquid separators 56, 58 and 60 are provided so as to correspond to the hydrogenation reactors 50, 52 and 54, respectively. The second fractionator 70 separates and refines the liquid hydrocarbons supplied from the vapor-liquid separators 56 and 58 according to boiling points. The naphtha stabilizer 72 distills liquid hydrocarbons of a naphtha fraction supplied from the vapor-liquid separator 60 and the second fractionator 70. Then the naphtha stabilizer 72 discharges butane and components lighter than butane as a flare gas, and separates and recovers components having a carbon number of five or more as a naphtha product.

Next, a process (GTL process) of synthesizing liquid fuel from natural gas by the liquid fuel synthesizing system 1 configured as above will be described.

A natural gas (whose main component is $CH_4$) as a hydrocarbon feedstock is supplied to the liquid fuel synthesizing system 1 from an external natural gas supply source (not shown), such as a natural gas field or a natural gas plant. The above synthesis gas production unit 3 reforms this natural gas to produce a synthesis gas (mixed gas including a carbon monoxide gas and a hydrogen gas as the main components).

Specifically, first, the above natural gas is supplied to the desulfurizing reactor 10 along with the hydrogen gas separated by the hydrogen separator 26. The desulfurizing reactor 10 hydrogenates and desulfurizes sulfur components included in the natural gas using the hydrogen gas, with, for example, a ZnO catalyst. By desulfurizing the natural gas in advance in this way, it is possible to prevent a decrease in activity of catalysts used in the reformer 12, the bubble column reactor 30, etc. by sulfur compounds.

The natural gas (may also contain a carbon dioxide) desulfurized in this way is supplied to the reformer 12 after the carbon dioxide ($CO_2$) gas supplied from a carbon-dioxide supply source (not shown) is mixed with the steam generated in the waste heat boiler 14. The reformer 12 reforms the natural gas by using a carbon dioxide and a steam to produce a high-temperature synthesis gas including a carbon monoxide gas and a hydrogen gas as the main components, by the above steam and carbon-dioxide-gas reforming method. At this time, the reformer 12 is supplied with, for example, a fuel gas for a burner disposed in the reformer 12 and air, and reaction heat required for the above steam and $CO_2$ reforming reaction, which is an endothermic reaction is provided by the heat of combustion of the fuel gas in the burner.

The high-temperature synthesis gas (for example, 900° C., 2.0 MPaG) produced in the reformer 12 in this way is supplied to the waste heat boiler 14, and is cooled down by the heat exchange with the water which flows through the waste heat boiler 14 (for example, 400° C.), thus the waste heat is recovered. At this time, the water heated by the synthesis gas in the waste heat boiler 14 is supplied to the vapor-liquid separator 16. From this vapor-liquid separator 16, a gas component is supplied to the reformer 12 or other external devices as a high-pressure steam (for example, 3.4 to 10.0 MPaG), and water as a liquid component is returned to the waste heat boiler 14.

Meanwhile, the synthesis gas cooled down in the waste heat boiler 14 is supplied to the absorption tower 22 of the $CO_2$ removal unit 20, or the bubble column reactor 30, after a condensate is separated and removed from the synthesis gas in the vapor-liquid separator 18. The absorption tower 22 absorbs a carbon dioxide gas included in the synthesis gas into the retained absorbent, to separate the carbon dioxide gas from the synthesis gas. The absorbent including the carbon dioxide gas within this absorption tower 22 is introduced into the regeneration tower 24, the absorbent including the carbon dioxide gas is heated and subjected to stripping treatment with, for example, a steam, and the resulting desorbed carbon dioxide gas is recycled to the reformer 12 from the regeneration tower 24, and is reused for the above reforming reaction.

The synthesis gas produced in the synthesis gas production unit 3 in this way is supplied to the bubble column reactor 30 of the above FT synthesis unit 5. At this time, the composition ratio of the synthesis gas supplied to the bubble column reactor 30 is adjusted to a composition ratio (for example, $H_2:CO=2:1$ (molar ratio)) suitable for the FT synthesis reaction. In addition, the pressure of the synthesis gas supplied to the bubble column reactor 30 is raised to a pressure (for example, about 3.6 MPaG) suitable for the FT synthesis reaction by a compressor (not shown) provided in a pipe which connects the $CO_2$ removal unit 20 with the bubble column reactor 30.

Further, a portion of the synthesis gas, the carbon dioxide gas of which has been separated by the above $CO_2$ removal unit 20, is also supplied to the hydrogen separator 26. The hydrogen separator 26 separates the hydrogen gas included in the synthesis gas, by the adsorption and desorption (hydrogen PSA) utilizing a pressure difference as described above. This separated hydrogen is continuously supplied from a gas holder (not shown), etc. via a compressor (not shown) to various hydrogen-utilizing reaction devices (for example, the desulfurizing reactor 10, the wax fraction hydrocracking reactor 50, the kerosene and gas oil fraction hydrotreating reactor 52, the naphtha fraction hydrotreating reactor 54, etc.) which perform the predetermined reactions utilizing the hydrogen within the liquid fuel synthesizing system 1.

Next, the above FT synthesis unit 5 synthesizes liquid hydrocarbons by the FT synthesis reaction from the synthesis gas produced by the above synthesis gas production unit 3.

Specifically, the synthesis gas, from which carbon dioxide gas has been separated in the above $CO_2$ removal unit 20, flows in from the bottom of the bubble column reactor 30, and flows up in the catalyst slurry contained in the bubble column reactor 30. At this time, within the bubble column reactor 30, the carbon monoxide and hydrogen gas which are included in the synthesis gas react with each other by the FT synthesis reaction, thereby producing hydrocarbons. Moreover, by flowing water through the heat transfer pipe 32 of the bubble column reactor 30 at the time of this synthesis reaction, the reaction heat of the FT synthesis reaction is removed, and the water heated by this heat exchange is vaporized into a steam. As for this steam, the water liquefied in the vapor-liquid separator 34 is returned to the heat transfer pipe 32, and a gas component is supplied to an external device as medium-pressure steam (for example, 1.0 to 2.5 MPaG).

The slurry containing the liquid hydrocarbons synthesized in the bubble column reactor 30 in this way are drawn from the middle part of the bubble column reactor 30, and is introduced into the separator 36. The separator 36 separates the drawn slurry into a catalyst (solid component), and a liquid component including a liquid hydrocarbon product. A part of the separated catalyst is returned to the bubble column reactor 30, and the liquid component is supplied to the first fractionator 40.

Further, the unreacted gas is introduced into the vapor-liquid separator 38 from the top of the bubble column reactor 30. The vapor-liquid separator 38 cools down the unreacted gas to separate some condensed liquid hydrocarbons to introduce them into the first fractionator 40. Meanwhile, a part of the gas component separated in the vapor-liquid separator 38 is returned to the bottom of the bubble column reactor 30, and is reused for the FT synthesis reaction. Moreover, the remaining part is utilized as a pressurized gas which will be described later, and the remainder is introduced into an external combustion facility (not shown) as a flare gas, and is emitted to the atmosphere after the combustion.

Next, the first fractionator 40 heats the liquid hydrocarbons (whose carbon numbers are various) supplied via the separator 36 and the vapor-liquid separator 38 from the bubble column reactor 30 as described above, to fractionally distill the liquid hydrocarbons utilizing a difference in boiling points. Thereby, the first fractionator 40 separates and refines the liquid hydrocarbons into a naphtha fraction (whose boiling point is lower than about 150° C.), a kerosene and gas oil fraction (whose boiling point is about 150 to 350° C.), and a wax fraction (whose boiling point is higher than about 350° C.). The liquid hydrocarbons (mainly $C_{21}$ or more) as the wax fraction drawn from the bottom of the first fractionator 40 are brought to the wax fraction hydrocracking reactor 50, the liquid hydrocarbons (mainly $C_{11}$ to $C_{20}$) as the kerosene and gas oil fraction drawn from the middle part of the first fractionator 40 are brought to the kerosene and gas oil fraction hydrotreating reactor 52, and the liquid hydrocarbons (mainly $C_5$ to $C_{10}$) as the naphtha fraction drawn from the upper part of the first fractionator 40 are brought to the naphtha fraction hydrotreating reactor 54.

The wax fraction hydrocracking reactor 50 hydrocracks the liquid hydrocarbons of wax fraction with a large carbon number (approximately $C_{21}$ or more), which has been supplied from the bottom of the first fractionator 40, by using the hydrogen gas supplied from the above hydrogen separator 26, to reduce the carbon number to $C_{20}$ or less. In this hydrocracking reaction, hydrocarbons with a small carbon number and with low molecular weight are produced by cleaving the C—C bonds of the hydrocarbons with a large carbon number, using a catalyst and heat. A product including the liquid hydrocarbons hydrocracked in this wax fraction hydrocracking reactor 50 is separated into gas and liquid in the vapor-liquid separator 56, the liquid hydrocarbons of which are brought to the second fractionator 70, and the gas component (including hydrogen gas) of which is brought to the kerosene and gas oil fraction hydrotreating reactor 52 and the naphtha fraction hydrotreating reactor 54.

The kerosene and gas oil fraction hydrotreating reactor 52 hydrotreats liquid hydrocarbons (approximately $C_{11}$ to $C_{20}$) as the kerosene and gas oil fractions having an approximately middle carbon number, which have been supplied from the middle part of the first fractionator 40, by using the hydrogen gas supplied via the wax fraction hydrocracking reactor 50 from the hydrogen separator 26. In this hydrotreating reaction, in order to obtain mainly branched-chain saturated hydrocarbons, the liquid hydrocarbons are isomerized, and a hydrogen are added to unsaturated bonds of the above liquid hydrocarbons to saturate the liquid hydrocarbons. As a result, a product including the hydrotreated liquid hydrocarbons is separated into a gas and a liquid in the vapor-liquid separator 58, the liquid hydrocarbons of which are brought to the second fractionator 70, and the gas component (including hydrogen gas) of which is reused for the above hydrogenation reaction.

The naphtha fraction hydrotreating reactor 54 hydrotreats liquid hydrocarbons of naphtha fraction with a low carbon number (approximately $C_{10}$ or less), which have been supplied from the upper part of the first fractionator 40, by using the hydrogen gas supplied via the wax fraction hydrocracking reactor 50 from the hydrogen separator 26. As a result, a product including the hydrotreated liquid hydrocarbons is separated into a gas and a liquid in the vapor-liquid separator 60, the liquid hydrocarbons of which are brought to the naphtha stabilizer 72, and the gas component (including hydrogen gas) of which is reused for the above hydrogenation reaction.

Next, the second fractionator 70 distills the liquid hydrocarbons supplied from the wax fraction hydrocracking reactor 50 and the kerosene and gas oil fraction hydrotreating reactor 52 as described above. Thereby, the second fractionator 70 separates and refines the liquid hydrocarbons into hydrocarbons (whose boiling point is lower than about 150° C.) with a carbon number of $C_{10}$ or less, kerosene (whose boiling point is about 150 to 250° C.), gas oil (whose boiling point is about 250 to 350° C.), and uncracked wax fraction (whose boiling point is higher than about 350° C.) from the wax fraction hydrocracking reactor 50. The gas oil is drawn from a lower part of the second fractionator 70, and the kerosene is drawn from a middle part thereof. Meanwhile, a hydrocarbon with a carbon number of $C_{10}$ or less is drawn from the top of the second fractionator 70, and is supplied to the naphtha stabilizer 72.

Moreover, the naphtha stabilizer 72 distills the hydrocarbons with a carbon number of $C_{10}$ or less, which have been supplied from the above naphtha fraction hydrotreating reactor 54 and second fractionator 70. Thereby, the naphtha stabilizer 72 separates and refines naphtha ($C_5$ to $C_{10}$) as a product. Accordingly, a high-purity naphtha is drawn from a lower part of the naphtha stabilizer 72. Meanwhile, the emission gas (flare gas) other than products, which contains as the main component hydrocarbons with a carbon number lower than or equal to a predetermined number (lower than or equal to $C_4$), is discharged from the top of the naphtha stabilizer 72.

The process (GTL process) of the liquid fuel synthesizing system 1 has been described above. By the GTL process concerned, a natural gas can be easily and economically converted into clean liquid fuels, such as high-purity naphtha ($C_5$ to $C_{10}$), lamp oil ($C_{11}$ to $C_{15}$), and gas oil ($C_{16}$ to $C_{20}$). Moreover, in the present embodiment, the above steam and carbon-dioxide-gas reforming method is adopted in the reformer 12. Thus, there are advantages in that a carbon dioxide contained in a natural gas as a feedstock, can be effectively utilized the composition ratio (for example, $H_2:CO=2:1$ (molar ratio)) of a synthesis gas suitable for the above FT synthesis reaction can be efficiently generated in one reaction of the reformer 12, and a hydrogen concentration adjustor, etc. is unnecessary.

Figure 2:
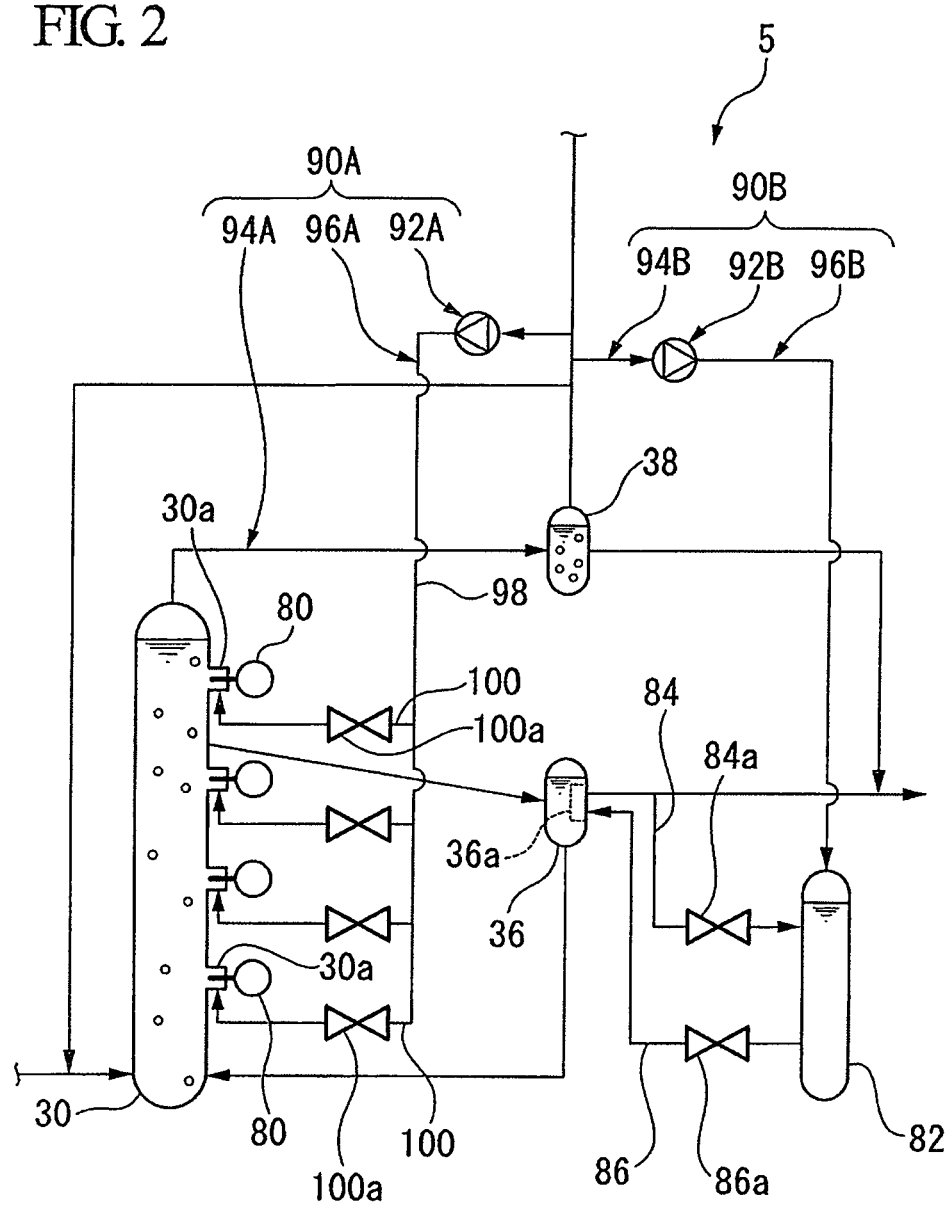
FIG. 2 is a schematic diagram showing main parts related to an unreacted gas supply device in an FT synthesis unit shown in FIG. 1.

Next, in the aforementioned FT synthesis unit 5, a device for supplying the pressurized gas to constituent apparatuses which constitute the FT synthesis unit 5 will be described in detail with reference to FIG. 2. In addition, in FIG. 2, for convenience of description, main constituent parts of the liquid fuel synthesizing system 1 shown in FIG. 1 are illustrated, and illustration of some constituent parts is omitted.

First, constituent devices to which the pressurized gas is supplied from a device for supplying the pressurized gas will be described before description of the device for supplying the pressurized gas.

In the present embodiment, in addition to the aforementioned constituent devices, the FT synthesis unit 5 includes a pressure gauge (instrument) 80 inserted into the bubble column reactor 30, and an oil supply drum 82 (containing drum) for backwashing which contains the liquid hydrocarbons. The pressure gauge 80 measures the pressure (or differential pressure) in the bubble column reactor 30. In the illustrated example, one end of the pressure gauge 80 is inserted into a nozzle part 30a (a connecting part between a instrument and another constituent device) which protrudes radially outward from the outer surface of the bubble column reactor 30.

The pressure gauge 80 measures the pressure of a fluid which has flowed through the nozzle part 30a outward from the inside of the bubble column reactor 30 and has reached the pressure gauge 80. In addition, a plurality (four in the illustrate example) of the nozzle parts 30a is opened into the bubble column reactor 30, and is provided at intervals with respect to each other in the bubble column reactor 30 along the height direction thereof, and the pressure gauge 80 is inserted into each nozzle part 30a.

The oil supply drum 82 for backwashing connects to the separator 36. In the illustrated example, a first flow path 84 that is a pipe which flows the liquid hydrocarbons from the separator 36 to the oil supply drum 82 for backwashing, and a second flow path 86 that is a pipe which flows the liquid hydrocarbons from the oil supply drum 82 for backwashing to the separator 36 are provided between the separator 36 and the oil supply drum 82 for backwashing. Further, the first flow path 84 and the second flow path 86 are provided with flow rate adjusting valves 84a and 86a which adjust the flow rate of the liquid hydrocarbons in the flow paths 84 and 86, respectively.

Further, in the present embodiment, the separator 36 includes a filter 36a which separates the liquid hydrocarbons and the catalyst particles therein. The filter 36a filtrates catalyst particles from a mixed fluid composed of the liquid hydrocarbons which pass through the filter 36a and the catalyst particles. The filter 36a is disposed in the separator 36 so that the mixed fluid brought from the bubble column reactor 30 passes therethrough so as to reach a connecting port between the separator 36 and the first flow path 84. Thereby, catalyst particles are separated by the filter 36a until the mixed fluid brought from the separator 36 reaches the connecting port, and only the liquid hydrocarbons are supplied to the connecting port and the oil supply drum 82 for backwashing. In addition, in the following, the direction in which the mixed fluid brought from the bubble column reactor 30 passes through the filter 36a is referred to as a forward flow path direction.

Furthermore, the connecting port between the second flow path 86 and the separator 36 is disposed so that the liquid hydrocarbons that flow through the second flow path 86 from the oil supply drum 82 for backwashing and are supplied to the separator 36 pass through the filter 36a toward a backward flow path direction that is a direction opposite to the forward flow path direction. This enables the liquid hydrocarbons supplied from the oil supply drum 82 for backwashing to wash (backwash) the catalyst particles or the like in the slurry accumulated on the surface of the filter 36a.

Next, a device for supplying the pressurized gas to these constituent devices will be described.

The FT synthesis unit 5 includes an unreacted gas supply device that draws from the bubble column reactor 30 and then pressurizes an unreacted gas in the bubble column reactor 30, and supplies the unreacted gas to the constituent devices which constitute the FT synthesis unit 5. In the illustrated example, the FT synthesis unit 5 is provided with a first unreacted gas supply device 90A which supplies the unreacted gas to each pressure gauge 80 and a second unreacted gas supply device 90B which supplies the unreacted gas to the oil supply drum 82 for backwashing, as the unreacted gas supply device.

Here, since the unreacted gas supply device 90A and 90B have almost the same configuration, the configuration, operation, and effects of the first unreacted gas supply device 90A will be described below.

[First Unreacted Gas Supply Device]

The first unreacted gas supply device 90A seals the pressure gauge 80 with the unreacted gas supplied to each pressure gauge 80. In the illustrated example, the first unreacted gas supply device 90A includes a pressurizing part 92A which pressurizes unreacted gas, a first flowing part 94A which draws unreacted gas in the bubble column reactor 30 to supply the unreacted gas to the pressurizing part 92A, and a second flowing part 96A which supplies the unreacted gas pressurized by the pressurizing part 92A to each pressure gauge 80.

The pressurizing part 92A is able to adjust the pressure applied to the unreacted gas, and is composed of, for example, an axial flow type compressor or the like.

The first flowing part 94A allows the bubble column reactor 30 and the pressurizing part 92A to connect with each other. In the illustrated example, the aforementioned vapor-liquid separator 38 is provided in the first flowing part 94A in the position from the bubble column reactor 30 to the pressurizing part 92A. The first flowing part 94A includes pipes which allow the bubble column reactor 30 and the vapor-liquid separator 38 to connect with each other and allows the vapor-liquid separator 38 and the pressurizing part 92A to connect with each other, and these pipes allow the bubble column reactor 30 and the pressurizing part 92A to connect with each other.

The second flowing part 96A allows the pressurizing part 92A and each nozzle part 30a into which the pressure gauge 80 is inserted to connect with each other. In the illustrated example, the second flowing part 96A includes a common pipe 98 which connects to the pressurizing part 92A, and a plurality of branch pipes 100 which branches from the common pipe 98 in correspondence with the nozzle parts 30a, respectively, and allow the common pipe 98 and the nozzle parts 30a to connect with each other. Each branch pipe 100 is provided so that the unreacted gas which has flowed through the branch pipe is supplied inward from the outside of the bubble column reactor 30 in the nozzle part 30a which connects to the branch pipe 100. Further, in the illustrated example, each branch pipe 100 is provided with a flow rate adjusting valve 100a, so that the flow rate of the unreacted gas which flows through the branch pipe can be adjusted.

Next, the operation of the first unreacted gas supply device 90A will be described taking as an example a case where the unreacted gas is supplied to the pressure gauge 80 that is located on the uppermost side in the height direction of the bubble column reactor 30 among a plurality of pressure gauges 80. First, the unreacted gas in the bubble column reactor 30 flows through the vapor-liquid separator 38 of the first flowing part 94A, as described above, and is then supplied to the pressurizing part 92A.

Next, the pressurizing part 92A pressurizes the supplied unreacted gas, and supplies the gas to the second flowing part 96A. At this time, in advance, among the flow rate adjusting valves 100a of the branch pipes 100 of the second flowing part 96A, the flow rate adjusting valve 100a of the branch pipe 100 that connects to the nozzle part 30a into which the pressure gauge 80 which is located on the uppermost side is inserted and is set to an open state, and the flow rate adjusting valves 100a of the other branch pipes 100 are set to a closed state. This allows the unreacted gas to flow through only the branch pipe 100 which connects to the nozzle part 30a which is located on the uppermost side.

Here, since the branch pipe 100 is provided so that the unreacted gas which has flowed through the branch pipe is supplied inward from the outside of the bubble column reactor 30 in the nozzle part 30a which connects to the branch pipe 100, fluid does not flow into the nozzle part 30a to which the unreacted gas has been supplied outward from the inside of the bubble column reactor 30, that is, the nozzle part 30a is sealed by the unreacted gas.

According to the FT synthesis unit 5 including the first unreacted gas supply device 90A shown above, since the unreacted gas drawn from the inside of the bubble column reactor 30 by the first unreacted gas supply device 90A is pressurized, and then supplied to the pressure gauge 80, which is a constituent device which constitutes the FT synthesis unit 5, this unreacted gas can be utilized as the pressurized gas. For this reason, it is possible to reduce the amount of the pressurized gas that needs to be supplied from the outside of a synthesizing system which synthesizes the liquid hydrocarbons and reduce the construction cost of the FT synthesis unit 5, and it is possible to synthesize the liquid hydrocarbons at low cost while saving energy.

Further, since the unreacted gas supplied to a constituent device by the first unreacted gas supply device 90A is produced in the process of synthesizing the liquid hydrocarbons, even when this unreacted gas is mixed with the slurry and the liquid hydrocarbons within the bubble column reactor 30 after the pressure gauge 80 is sealed, the influence on the process of synthesizing the liquid hydrocarbons can be made minimal.

Moreover, since the nozzle part 30a, which is a connecting part between the pressure gauge 80 and the bubble column reactor 30, can be sealed by the unreacted gas, precise measurement by the pressure gauge 80 is attained. In addition, when the nozzle part 30a is not sealed, there is a possibility that the catalyst particles suspended in the slurry may adhere to the nozzle part 30a, thereby blocking the opening of the nozzle part 30a, and pressure measurement by the pressure gauge 80 may not be precisely performed.

Further, since an environment that is optimal to synthesize the liquid hydrocarbons can be achieved in the bubble column reactor 30 by allowing a more precise measurement, superfluous energy is not required and the liquid hydrocarbons can be synthesis at low cost, while saving more energy.

Further, since the first and second flowing parts 94A and 96A are provided, the setting position of the pressurizing part 92A can be made arbitrary, and the flexibility in design can be improved.

Since the liquid fuel synthesizing system 1 including the FT synthesis unit 5 include the FT synthesis unit 5 which can reduce the construction cost of the apparatus and synthesize the liquid hydrocarbons at low cost, while saving energy is provided, the construction cost of the apparatus of the liquid fuel synthesizing system 1 can be reduced, and liquid fuels can be synthesized at low cost, while saving energy.

[Second Unreacted Gas Supply Device]

Next, the second unreacted gas supply device 90B will be described. In addition, only points which are different from the first unreacted gas supply device 90A will be described about the second unreacted gas supply device 90B. Further, those (92B, 94B, 96B) obtained by changing the alphabet A of the suffixes of the reference numerals (92A, 94A, 96A) of the individual components in the first unreacted gas supply device 90A into the alphabet B are used as reference numerals which represent the pressurizing part, first flowing part, and second flowing part of the second unreacted gas supply device 90B.

The second unreacted gas supply device 90B supplies the liquid hydrocarbons contained in the oil supply drum 82 for backwashing as a washing liquid which washes the separator 36 by the unreacted gas supplied to the oil supply drum 82 for backwashing.

The second flowing part 96B of the second unreacted gas supply device 90B supplies the unreacted gas pressurized by the pressurizing part 92B to the oil supply drum 82 for backwashing. In the illustrated example, the second flowing part 96B is a pipe which allows the pressurizing part 92B and the top of the oil supply drum 82 for backwashing to connect with each other, and the unreacted gas supplied from the second flowing part 96B is supplied to a gaseous phase part of the oil supply drum 82 for backwashing.

Next, the operation of supplying the unreacted gas to the oil supply drum 82 for backwashing in the second unreacted gas supply device 90B will be described.

First, similarly to the first unreacted gas supply device 90A, the unreacted gas in the bubble column reactor 30 flows through the first flowing part 94B, and then supplied to the pressurizing part 92B.

Next, the pressurizing part 92B pressurizes the supplied unreacted gas, and supplies the gas to the second flowing part 96B. At this time, in advance, the flow path adjusting valve 84a of the first flow path 84 is set to a closed state, and the flow path adjusting valve 86a of the second flow path 86 is set to an open state. Thereby, the unreacted gas supplied to the oil supply drum 82 for backwashing pressurizes the liquid hydrocarbons contained inside the drum 82 from the gaseous phase part side, and the liquid hydrocarbons are supplied to the separator 36 through the second flow path 86.

Then, the liquid hydrocarbons introduced to flow through the second flow path 86 from the oil supply drum 82 for backwashing flows through the filter 36a of the separator 36 in the backward flow path direction to perform backwashing. That is, the second unreacted gas supply device 90B supplies the liquid hydrocarbons contained in the oil supply drum 82 for backwashing as a washing liquid which washes the separator 36.

According to the FT synthesis unit 5 including the second unreacted gas supply device 90B shown above, the same operation effects as the FT synthesis unit including the first unreacted gas supply device 90A are exhibited. Further, the unreacted gas can supply the liquid hydrocarbons in the oil supply drum 82 for backwashing to the separator 36. In addition, since a large amount of pressurized gas is required in order to supply a fluid from the containing drum which contains the fluid like the oil supply drum 82 for backwashing, the used amount of pressurized gas supplied from the outside of the synthesizing system which synthesizes the liquid hydrocarbons can be greatly reduced by utilizing the unreacted gas.

Further, since the unreacted gas can supply the liquid hydrocarbons in the oil supply drum 82 for backwashing as a washing liquid which washes the separator 36, the separator 36 can be maintained in a clean state. For this reason, since the liquid hydrocarbons and the catalyst particles can be smoothly separated from each other, it is possible to efficiently separate the liquid hydrocarbons from the mixed fluid.

In addition, when the separator 36 is not washed, there is a possibility that the separation may not be smoothly performed, for example, since the catalyst particles in the slurry stick to the filter 36a. Further, a large quantity of washing liquid is required in order to always run the separator 36 while liquid fuels are produced. The separator 36 utilizes the unreacted gas, so that the used amount of pressurized gas supplied from the outside of the synthesizing system which synthesizes the liquid hydrocarbons can be greatly reduced.

Although the preferred embodiments of the invention have been described with reference to the accompanying drawings, the invention is not limited to such embodiments. It is apparent to those skilled in the art that various alternations or modifications can be made in the category as set forth in the claims, and it will be understood that these alternations or modifications naturally belongs to the technical scope of the present invention.

For example, in the above embodiments, a natural gas is used as a hydrocarbon feedstock to be supplied to the liquid fuel synthesizing system 1. However, the invention is not limited to such an example. For example, other hydrocarbon feedstocks, such as asphalt and residual oil, may be used.

Furthermore, in the above embodiments, the liquid hydrocarbons are synthesis by the FT synthesis reaction as a synthesis reaction in the bubble column reactor 30. However, the invention is not limited to this example. Specifically, the invention can also be applied to, for example, oxo synthesis (hydroformylation reaction) "R—CH=CH$_2$+CO+H$_2$→R—CH$_2$CH$_2$CHO", methanol synthesis "CO+2H$_2$CH$_3$OH", dimethylether (DME) synthesis "3CO+3H$_2$→CH$_3$OCH$_3$+ CO$_2$", etc., as the synthesis reaction in the bubble column reactor 30.

Additionally, in the above embodiment, the FT synthesis unit 5 includes both the first unreacted gas supply device 90A and the second unreacted gas supply device 90B, but may be configured to include only one.

Moreover, in the above embodiment, the FT synthesis unit 5 is configured to include the unreacted gas supply device 90A and 90B, and not to include a device for supplying the pressurized gas from the outside of the synthesizing system which synthesizes the liquid hydrocarbons. However, the FT synthesis unit 5 may be configured to use both together.

Furthermore, although the above-mentioned embodiment has shown the pressure gauge 80 and the oil supply drum 82 for backwashing as constituent devices to which the unreacted gas is supplied from the unreacted gas supply device 90A and 90B, the kind of the constituent devices and the number of the constituent devices to be provided are not limited to those shown in the above embodiment.

For example, the constituent devices may not be the pressure gauge 80, but may be instruments which measure temperature or the like other than pressure. Further, the instruments may be provided somewhere other than the bubble column reactor 30.

Furthermore, the constituent devices may be a containing drum which contains the fluid of at least one of the slurry and the liquid hydrocarbons, and connect to other constituent device to supply the fluid to the other constituent device. An example of this drum container includes a slurry concentration adjusting drum for adjusting the concentration of the slurry in the bubble column reactor 30 at the time of starting or operation of the FT synthesis unit 5. The slurry concentration adjusting drum is one which contains the slurry therein, and connects to the bubble column reactor 30. The slurry concentration adjusting drum includes, for example, a FT slurry adjusting drum which adjusts the concentration at the time of start-up of the FT synthesis unit 5, a FT slurry makeup drum which adjusts concentration during the operation of the FT synthesis unit 5, etc.

Moreover, in the above embodiment, the plurality of unreacted gas supply devices 90A and 90B include mutually different pressurizing parts 92A and 92B, respectively. However, as shown in FIG. 3, the unreacted gas supply device may include a common pressurizing part 114.

Figure 3:
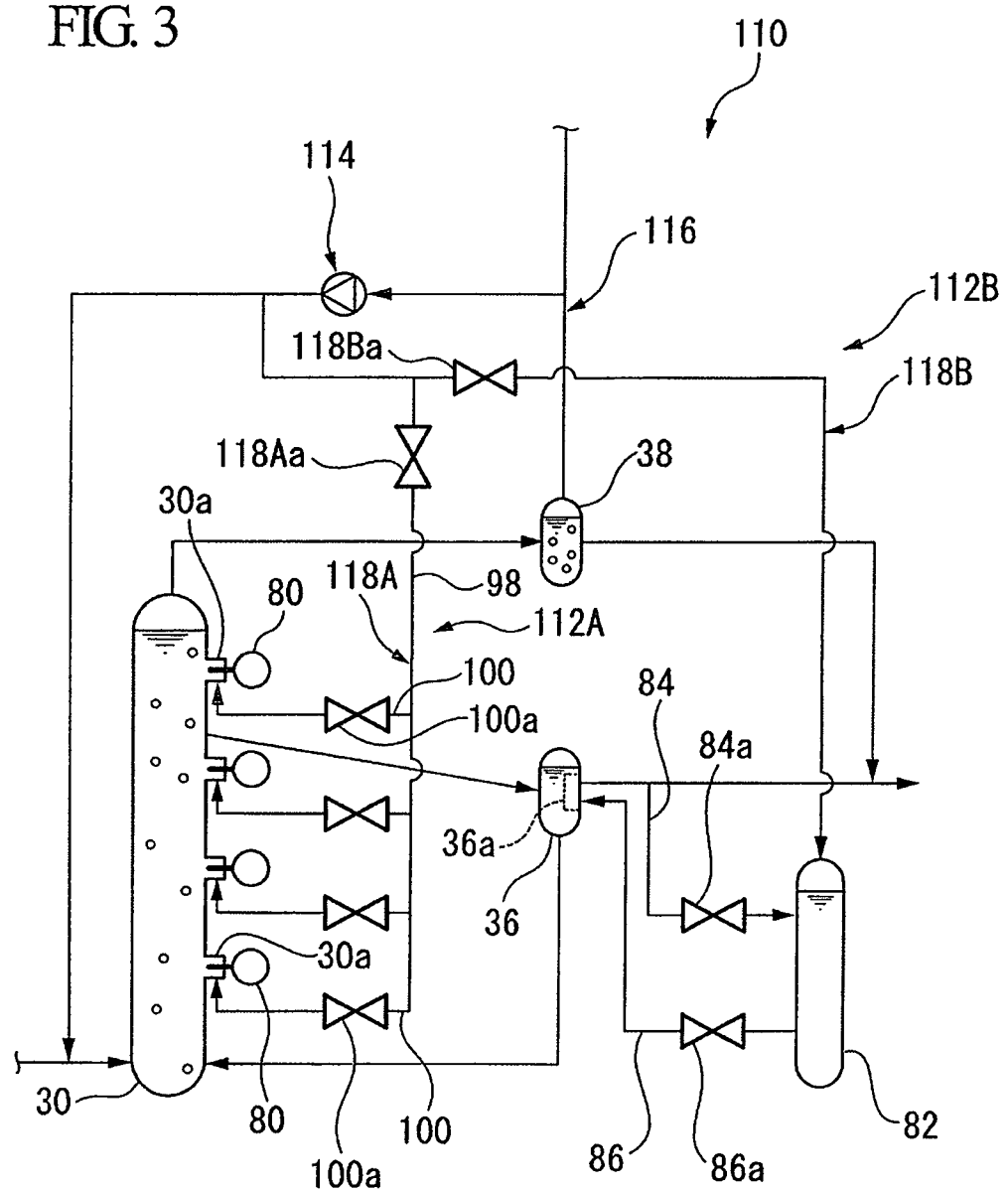
FIG. 3 is a schematic diagram showing main parts related to an unreacted gas supply device in a modification of the FT synthesis unit of one embodiment according to the present invention.

In the FT synthesis unit 110 shown in FIG. 3, the first unreacted gas supply device 112A includes the pressurizing part 114, a first flowing part 116, and a second flowing part 118A. In the illustrated example, the first flowing part 116 becomes common to a part of a flow path for the unreacted gas which is separated by the vapor-liquid separator 38 and return to the bottom of the bubble column reactor 30 again, and the pressurizing part 114 is provided in the portion of the flow path that is located nearer to the bubble column reactor 30 than the vapor-liquid separator 38. Furthermore, the second flowing part 118A branches from the flow path in the portion of the flow path which is located nearer to the bubble column reactor 30 than the pressurizing part 114.

Furthermore, the second unreacted gas supply device 112B includes a pressurizing part and a first flowing part which are common to the pressurizing part 114 and the first flowing part 116 of the unreacted gas supply device 112A, and further includes the second flowing part 118B. The portion of the second flowing part 118B which is located on the side of the pressurizing part 114 becomes a common part which is common to the second flowing part 118A of the first unreacted gas supply device 112A, and is branched from an end of this common part toward constituent devices which supply unreacted gas.

Additionally, the second flowing part 118A of the first unreacted gas supply device 112A is provided with a flow rate adjusting valve 118Aa which is nearer to the pressure gauge 80 than the end, and the second flowing part 118B of the second unreacted gas supply device 112B is provided with a flow rate adjusting valve 118Ba which is nearer to the oil supply drum 82 for backwashing than the end. The flow rate adjusting valves 118Aa and 118Ba can adjust the flow rate of the unreacted gas which flows through each of the second flowing parts 118A and 118B.

According to the FT synthesis unit 110 shown in FIG. 3, the plurality of unreacted gas supply device 112A and 112B includes the common pressurizing part 114. Thus, compared with the case where the unreacted gas supply device 112A and 112B includes mutually different pressurizing parts, respectively, the construction cost of the apparatus can be further reduced.

INDUSTRIAL APPLICABILITY

A hydrocarbon synthesis reaction apparatus, a hydrocarbon synthesizing method, and a hydrocarbon synthesis reaction system including a hydrocarbon synthesis reaction apparatus according to the present invention can reduce the amount of the pressurized gas used that needs to be supplied from the outside of a synthesizing system which synthesizes a hydrocarbon compound, reduce the construction cost of the apparatus, and synthesize a hydrocarbon compound at a low cost, while saving energy.

DESCRIPTION OF REFERENCE NUMERALS

1: LIQUID FUEL SYNTHESIZING SYSTEM
3: SYNTHESIS GAS PRODUCTION UNIT
5, 110: FT SYNTHESIS UNIT (HYDROCARBON SYNTHESIS REACTION APPARATUS)
7: UPGRADING UNIT
30: BUBBLE COLUMN REACTOR (REACTOR OR OTHER CONSTITUENT DEVICE)
30a: NOZZLE PART (CONNECTING PART WITH OTHER CONSTITUENT DEVICE)
36: SEPARATOR (MIXED FLUID SEPARATING DEVICE)
80: PRESSURE GAUGE (INSTRUMENT)
82: OIL SUPPLY DRUM FOR BACKWASHING (CONTAINING DRUM)
90A, 112A: FIRST UNREACTED GAS SUPPLY DEVICE (UNREACTED GAS SUPPLY DEVICE)
90B, 112B: SECOND UNREACTED GAS SUPPLY DEVICE (UNREACTED GAS SUPPLY DEVICE)
92A, 92B, 114: PRESSURIZING PART
94A, 94B, 116: FIRST FLOWING PART
96A, 96B, 118A, 118B: SECOND FLOWING PART

The invention claimed is:

1. A hydrocarbon synthesis reaction apparatus for synthesizing a hydrocarbon compound by a chemical reaction of a synthesis gas including hydrogen and carbon monoxide as main components, and a slurry having solid catalyst particles suspended in liquid, the hydrocarbon synthesis reaction apparatus comprising:
a reactor in which the synthesis gas contacts with the slurry; and
an unreacted gas supply device for drawing an unreacted gas from the reactor, then pressurizing the unreacted gas, and supplying the unreacted gas to a first constituent device, wherein
the first constituent device is a measuring instrument inserted into a second constituent device which is configured to contain the slurry or allow the slurry to flow through, and
the unreacted gas supply device is configured to supply the unreacted gas to the instrument to thereby seal a connecting part between the instrument and the second constituent device.

2. A hydrocarbon synthesis reaction apparatus for synthesizing a hydrocarbon compound by a chemical reaction of a synthesis gas including hydrogen and carbon monoxide as main components, and a slurry having solid catalyst particles suspended in liquid, the hydrocarbon synthesis reaction apparatus comprising:
a reactor in which the synthesis gas contacts with the slurry; and
an unreacted gas supply device for drawing an unreacted gas from the reactor, then pressurizing the unreacted gas, and supplying the unreacted gas to a first constituent device, wherein
the first constituent device is a containing drum which is configured to contain a fluid which contains at least one of the slurry and the hydrocarbon compound, and to supply the fluid to a second constituent device, and the unreacted gas supply device is configured to supply the unreacted gas to the containing drum to thereby supply the fluid to the second constituent device from the containing drum.

3. The hydrocarbon synthesis reaction apparatus according to claim 2, wherein
the fluid contains the hydrocarbon compound,
the second constituent device is a mixed fluid separating device for separating a mixed fluid of the hydrocarbon compound and the catalyst particles, and
wherein when the unreacted gas supply device supplies the unreacted gas to the containing drum, the hydrocarbon compound contained in the containing drum is supplied to the mixed fluid separating device as a washing liquid which washes the mixed fluid separating device.

4. The hydrocarbon synthesis reaction apparatus according to claim 1 or 2, wherein
the unreacted gas supply device has
a pressurizing part for pressurizing the unreacted gas,
a first flowing part for drawing the unreacted gas in the reactor to supply the unreacted gas to the pressurizing part, and
a second flowing part for supplying the unreacted gas pressurized by the pressurizing part to the first constituent device.

5. A hydrocarbon synthesis reaction system comprising:
hydrocarbon synthesis reaction apparatus according to claim 1 or 2;
a synthesis gas production unit for reforming a hydrocarbon feedstock to produce the synthesis gas, and supplying the synthesis gas to the reactor of the hydrocarbon synthesis reaction apparatus; and
an upgrading unit for refining the hydrocarbon compounds into liquid fuels.

6. A hydrocarbon synthesis method using the hydrocarbon synthesis reaction apparatus of claim 1 for synthesizing a hydrocarbon compound by a chemical reaction of a synthesis gas including hydrogen and carbon monoxide as main components, and a slurry having solid catalyst particles suspended in liquid, the hydrocarbon synthesis method comprising:
drawing unreacted gas from the reactor, pressurizing the unreacted gas; and supplying the unreacted gas to a the first constituent device, wherein
in the second constituent device the slurry is contained or flowing through, and
the unreacted gas supply device supplies the unreacted gas to the instrument to seal a connecting part between the instrument and the second constituent device.

7. A hydrocarbon synthesis method using the hydrocarbon synthesis reaction apparatus of claim 2 for synthesizing a hydrocarbon compound by a chemical reaction of a synthesis gas including hydrogen and carbon monoxide as main components, and a slurry having solid catalyst particles suspended in liquid, the hydrocarbon synthesis method comprising:

drawing unreacted gas from the reactor, pressurizing the unreacted gas; and supplying the unreacted gas to the first constituent device, wherein the containing drum contains a fluid which contains at least one of the slurry and the hydrocarbon compound, and supplies the fluid to the second constituent device, and the unreacted gas supply device supplies the unreacted gas to the containing drum to supply the fluid to the second constituent device from the containing drum.

* * * * *

UNITED STATES PATENT AND TRADEMARK OFFICE
CERTIFICATE OF CORRECTION

PATENT NO. : 8,569,386 B2
APPLICATION NO. : 12/998187
DATED : October 29, 2013
INVENTOR(S) : Yasuhiro Onishi et al.

It is certified that error appears in the above-identified patent and that said Letters Patent is hereby corrected as shown below:

In the Specification

Column 5, line 52, change "(PDX)" to -- (POX) --;

Column 18, line 38, change "hydrocarbon" to -- the hydrocarbon --;

In the Claims

Column 18, line 54, change "gas to a the" to -- gas to the --.

Signed and Sealed this
Fifth Day of August, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,569,386 B2  Page 1 of 1
APPLICATION NO. : 12/998187
DATED : October 29, 2013
INVENTOR(S) : Onishi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 301 days.

Signed and Sealed this
Twenty-second Day of September, 2015

Michelle K. Lee
*Director of the United States Patent and Trademark Office*